United States Patent [19]

Fitzgerald et al.

[11] Patent Number: 5,623,028
[45] Date of Patent: Apr. 22, 1997

[54] HEAT CURED RUBBERS

[75] Inventors: John J. Fitzgerald, Clifton Park; John A. Osaheni, Niskayuna; Stanlee T. Buddle, Gloversville, all of N.Y.; Donald T. Pero, Adams, Mass.

[73] Assignee: General Electric Company, Waterford, N.Y.

[21] Appl. No.: 566,250

[22] Filed: Dec. 1, 1995

[51] Int. Cl.$^6$ .................................................. C08F 283/00
[52] U.S. Cl. ...................... 525/474; 523/212; 524/492; 524/493; 525/477; 525/478
[58] Field of Search .................. 525/474, 477, 525/478; 524/492, 493; 523/212

[56] References Cited

U.S. PATENT DOCUMENTS

| | | | |
|---|---|---|---|
| 2,803,619 | 8/1957 | Dickmann | 260/42 |
| 3,817,910 | 6/1974 | Vikmar | 260/37 |
| 4,539,357 | 9/1985 | Bobear | 524/267 |
| 4,690,967 | 9/1987 | LaGarde et al. | 524/266 |
| 5,153,244 | 10/1992 | Akitomo et al. | 524/88 |
| 5,200,440 | 4/1993 | Takago et al. | 523/213 |
| 5,219,922 | 6/1993 | Steinberger et al. | 524/785 |
| 5,260,364 | 11/1993 | Johnson | 524/413 |

*Primary Examiner*—Edward J. Cain
*Attorney, Agent, or Firm*—Kenneth S. Wheelock

[57] ABSTRACT

Control of the surface silanol density in silica fillers used in formulating heat curable rubbers enables control of the percent sealing force retention of the composite. Functionalizing the chemical agents used to effect such control adds additional means of controlling the physical properties of the resulting rubbers, especially silicone rubbers.

4 Claims, No Drawings

HEAT CURED RUBBERS

FIELD OF THE INVENTION

The present invention relates to heat curable silicone rubber formulations suitable for use as gaskets wherein the physical properties of the heat curable silicone rubber, synthetic or natural rubber are controlled by controlling the surface silanol density of silica fillers by treating the silica fillers wherein the surface hydroxyl content is controlled within a certain ranges to yield a silica filled heat curable rubber having a given property controlled within another given range.

BACKGROUND OF THE INVENTION

Most heat-curing silicone rubbers are based on high molecular weight silicone polymer gums. Gums, fillers, and additives are mixed in dough mixers or Banbury type mixers or mills to produce the heat curable formulation. Curing catalysts are added on water cooled rubber mills, to avoid premature heat cure, which can sometimes be used for the entire formulation in small-scale processes.

Silicone rubbers are commercially available as gums, filler-reinforced gums, dispersions, and uncatalyzed and ready-to-use catalyzed mixtures. The following types of gums are commercially available:

1) general purpose gums based on methyl and vinyl gums,
2) high and low temperature gums based on phenyl, vinyl, and methyl gums,
3) low compression set gums based on methyl and vinyl gums,
4) low shrink gums, i.e. gums which have been devolatilized, and
5) solvent resistant gums, based on fluorosilicone gums.

The consistency of uncured rubber mixtures ranges from a tough putty to a hard deformable plastic. Those rubbers containing reinforcing fillers tend to stiffen on storage due to the development of structure in the filler. Low viscosity fluids added to the rubber, such as water, diphenylsilanediol, or silicone fluids inhibit stiffening and the development of structure.

The properties of fabricated rubber depend not only on the chemical nature of the gum but also on the properties of the filler, additives, and type of curing catalyst. Consequently, the resultant property profile of a given heat cured silicone rubber is highly dependent on the chemical nature of the various constituent components as well as the relative proportions of those components. For example, a high filler content increases hardness and solvent resistance of the resulting rubber. Such increased hardness and solvent resistance however, comes at the price of a reduced elongation.

Not only do the properties of heat cured silicone rubber vary with the nature of the silicone gum and the various additives as well as their respective proportions but the properties also vary as a result of the various procedures used to compound the rubber. Properties of a heat cured rubber may therefore vary as a function of the thoroughness of the mixing and the degree of wetting of the filler by the gum. All other factors being equal, a hydrophilic filler as opposed to a hydrophobic filler will impart significantly different properties to a finished rubber.

Further, properties of heat cured rubbers change with time. This is particularly true during the initial periods of the curing reaction. Since silicone rubbers are complex chemical mixtures, the cure reactions and associated side reactions never completely stop although they may slow down considerably after the initial cure. The properties of a heat cured rubber change slowly with age.

Silicone rubbers may be cured by one of three general curing techniques:

1) hydrosilylation,
2) free radical initiation, and
3) high energy radiation initiation.

For a hydrosilylation cure, high molecular weight polymers, i.e. gums, possessing a vinyl functionality are reacted with low molecular weight hydride-functional cross-linking agents. A stable platinum complex, functioning as a catalyst, is added along with an inhibitor to prevent cure initiation prior to heating.

Free radical curing of silicone rubbers is effected by heating the rubber precursor in the presence of a free radical initiator such as benzoyl peroxide. The predominant mechanism operating involves hydrogen abstraction from the methyl groups of the dimethylsiloxane moiety followed by radical attack on another methyl group creating a cross-linking ethylene bridge. If a small percentage of vinyl groups are present, the methyl radical can add to the vinylic double bond. In addition to benzoyl peroxide, other radical cure initiators include bis(2,4-dichlorobenzoyl)peroxide, tert-butyl peroxybenzoate, dicumyl peroxide, 2,5-dimethyl-di-(tert-butylperoxy)hexane, and 1,1-di-(tert-butylperoxy)-trimethylcyclohexane. Both 2,5-dimethyl-di-(tert-butylperoxy)hexane, and 1,1-di-(tert-butylperoxy)trimethylcyclohexane are particularly useful and specific as free radical cure initiators for vinyl silicone heat cured rubbers.

High energy radiation, either as gamma rays or as an electron beam, can also effect cures. This type of cure causes a wide variety of bonds to be broken, thus cross-links occur between a variety of different atomic centers as the radicals created by the high energy recombine to form new chemical bonds.

When a heat cured rubber formulation is used to manufacture products such as gaskets, the particular end use and the environment of that end use govern how the material is formulated and processed. In the case of gaskets, compression set, sealing force, and retention of sealing force are important measures of performance. Compression set has been a significant factor in heat cured rubber technology for many years.

U.S. Pat. No. 2,803,619 discloses a polydimethylsiloxane gum filled with fumed silica and diatomaceous earth having a low compression set. The heat cured rubber of the 619 patent was cured by a peroxide initiated vulcanization lasting five minutes at 150° C. followed by a twenty-four hour cure at 250° C. Subsequently after an additional twenty-two hours at 150° C., the compression set of the finished rubber was measured.

Curing of a heat cured rubber begins when the cure is initiated during the molding process. The cure must be sufficiently rapid that the article can be removed from the mold without deformation. Yet the requirement that the finished product possess elastomeric properties in some degree means that the cure cannot proceed to the extent that the initially elastomeric heat cured rubber is no longer deformable. Thus the kinetics of the cure reaction must be carefully balanced for a rapid initial cure.

Subsequent developments have focused on three technical issues:

1) in-situ filler treatment,
2) post-reaction catalyst inhibition, and 3) additives.

In-situ filler treatment may be divided into two broad classes: 1) vinyl silazane treatment of the filler, and 2) vinyl alkoxy silane treatments.

In the case of free-radical cures, generally peroxide initiated, the initiator is consumed. Use of gamma radiation or high energy electron beams also leaves no reactive residues in the rubber. When a hydrosilylation catalyst is used to effect a cure in a vinyl-hydride compound rubber, the cure must be controlled because the catalyst is not destroyed by the cure reaction. Thus a large variety of inhibitor compounds have been used: alkaline earth metal silicates (U.S. Pat. No. 3,817,910), metal sulfides (U.S. Pat. No. 5,219,922), boron compounds (U.S. Pat. No. 4,690,967), and various organic compounds (U.S. Pat. No. 5,153,244).

Additives to heat cured rubbers to control compression set most frequently involve the addition of substituted silicone resins. Recently, in sharp contrast, spinels have been used to control compression set (U.S. Pat. No. 5,260,364). Since the silicone resins added to the heat cured rubber formulation for compression set control are highly branched silicone resins, depending on when these resins are added can sometimes lead to the conclusion that these materials form part of the elastomeric matrix of the heat cured rubber.

A current problem not yet solved by the art deals with the incompletely reacted surface silanol groups of the various silica fillers currently in use. The presence of reactive, i.e. unreacted, surface hydroxyl or silanol groups in a silica filler leads to condensation reactions and structuring of the filler. One solution currently in use is to use silanol or methoxy stopped silicone fluids as blending agents to assist in dispersing the filler into the gum and also provide a reaction center that does not lead to structuring of the filler. In a sense, these blending agents are reactive diluents as they react with the filler surface hydroxyl or silanol groups preventing the condensation reactions between filler particles or filler and gum molecules that lead to stiffening and a loss of elastomeric properties.

SUMMARY OF THE INVENTION

The present invention provides for a means of controlling physical properties of heat curable rubbers or other thermosets by controlling the density of surface silanol groups on fumed or pyrogenic silica used as a reinforcing filler in the heat curable rubber.

The present invention further provides that by controlling the surface silanol density of fumed or pyrogenic reinforcing silica fillers within certain ranges, the sealing force retention of heat curable rubbers formulated to contain such a silica where the surface silanol density is controlled, may be controlled within certain ranges.

By controlling the surface silanol density of fumed or pyrogenic reinforcing silica fillers in heat curable rubbers the present invention further provides for a means of lowering or raising the quantity of reinforcing filler present in the composition while retaining a significantly larger proportion of desirable physical properties such as Durometer and sealing force retention.

Further, when the agent used to control the surface silanol density of the silica filler is also a functionalizing agent, additional control over the physical properties of the heat curable rubber (silicone, synthetic or natural) rubber is possible.

Thus the present invention provides for a process for controlling the percent sealing force retention of cured heat curable rubbers comprising:

1) contacting a flamed silica filler having a surface with a compound that will react with silanol groups present on said surface of said silica, thereby
2) forming reacted surface silanol groups that are the product of contacting said silica with said treating agent from a portion of said surface silanol groups, thereby reducing the number of unreacted surface silanol groups present on the surface of said fumed silica per unit surface of said silica, said number of unreacted surface silanol groups per unit surface of said silica being the density of unreacted surface silanol groups per unit surface, producing thereby a treated fumed silica filler; and
3) adding said treated fumed silica filler treated by steps 1) and 2) to a heat curable rubber composition whereby when said heat curable rubber composition is cured the percent sealing force retention of said heat curable rubber is increased by comparison to a cured heat curable rubber containing a fumed silica filler that has not been treated by steps 1) and 2).

The present invention further provides for a process where the fumed silica is treated with a functionalizing surface treating agent whereby the density of surface silanol groups is reduced and the chemical groups attached to the reacted surface silanol groups possess functional groups wherein the amount of treated reinforcing silica filler may be increased in said heat curable rubber composition by a factor of up to about two whereby percent sealing force retention decreases by no more than fifty percent when the amount of said treated silica in said rubber composition is so increased.

The present invention additionally provides for heat curable rubbers compounded with silicas treated by the processes of the present invention.

DETAILED DESCRIPTION OF THE INVENTION

The present invention provides for a class of fumed or pyrogenic silica fillers wherein the surface silanol density of the filler is controlled. A unique aspect of the present invention regards the surface properties of the fumed silica filler used as a reinforcing filler in the heat curable compositions of the present invention. Various forms of untreated and treated pyrogenic or fumed silica fillers have been employed. Frequently the treatments of choice involve treating with low molecular weight cyclic oligomeric silicones such as octamethylcyclotetrasiloxane or silazane species such as hexamethyldisilazane. The art of such treated fillers has even involved double treating of such materials, using a silazane treatment followed by a finishing treatment with a low molecular weight cyclic silicone oligomer, or vice versa. Usually these treatments are conducted in situ and on an ad hoc basis. A secondary method of treating fillers constitutes the addition of low molecular weight silanol stopped organosiloxanes which are usually referred to as processing aids. Frequently, the techniques have been such that process aids are selected for their ability to fulfill a dual function, that is to reduce the viscosity of the gum blend and treat the surface of the fumed silica reinforcing filler, simultaneously. Applicants have discovered that it is immaterial whether the pyrogenic or fumed silica is treated once or twice, in situ or ex situ, and the critical properties of the treated filler are not so much an extensive property such as surface area but an intensive property, the surface density of unreacted hydroxyl terminations. Further, the benefits imparted by the process of controlling the surface silanol density of unreacted or unfunctionalized surface silanol groups is independent of the rubber or the mechanism of curing the rubber. The benefits are most readily apparent when a silica is treated and a curable rubber composition is prepared and two formulations are compared after being cured in the same manner, the two formulations being the curable rubber composition with the treated silica and an identical formulation with the untreated version of the silica. Thus the benefits of Applicants invention are broadly applicable to a large variety of curable polymeric systems where silica fillers may be employed and a re independent of the curing mechanism, independent of peroxide cure, condensation cure, or addition cure, e.g. hydrosilylation cure in the case of silicones.

In amorphous materials high surface area materials such as silicas, aluminas, silica-alumina co-gels and the like, the high frequency of crystallographic stacking faults, Schottkey and Frenkel defects that give rise to very low crystallite size and thus high surface area, lead to deficiencies in satisfying the oxidation state of the primary cations involved in the structure. Whether the structure is inorganic and thus relies on the presence of oxygen or sulfur for the anions or organic as in the case of activated carbon, the valence deficiencies that occur as a consequence of the phase boundary where the structure terminates are satisfied by hydrogen. With oxides this leads to surface hydroxyl groups. In the case of silicas, these surface hydroxyl or silanol groups readily inter-condense forming Si—O—Si bonds between adjacent particles that lead to structuring of the silica particles. Irrespective of how this intensive property is controlled, when the surface hydroxyl or silanol density of a fumed silica is controlled, in a constant composite formulation where the only significant variable is the change in the surface silanol density of the silica, certain physical properties of the composite vary in a similarly regular manner. This variation in an intensive property of the silica by being controllable leads to a controllable variation in the physical properties of the composite, in the particular embodiments utilized by the present invention, the relevant composites are heat curable rubbers and thermosets. While prior art treatments may have accomplished this control to a greater or lesser degree, the results achieved by the various surface treatments were not linked with the control of surface properties of the silica, e.g. surface silanol density. However, it is not the treatment of the silica with a specific chemical agent per se that is the necessary and sufficient criterion but reducing the surface concentration of hydroxyl or silanol groups on the silica surface that is critical. By recognizing that surface silanol density may be controlled leading to control of physical properties in rubbers and thermosets the present invention thus provides for a method of predictably varying and controlling the resulting physical properties over a fairly wide range of variation. This criticality is further extended and amplified when the chemical structures blocking the surface silanol groups are functionalized. Functionalization of the silanol blocking groups provides a means of chemically bonding the filler to the polymer matrix and this has further effects on the physical properties. In this instance it becomes possible to reduce the amount of filler and still obtain the same physical properties.

A secondary issue is the chemical manner in which the surface silanol density is controlled. As initially produced, fumed or pyrogenic silica particles will tend to have a maximum silanol density. Thermal annealing and other physical treatments leading to silanol condensation as well as chemical reaction or blocking of the surface silanol groups generally only act to reduce this initial maximum density. A wide variety of chemical reactions may be employed to react with the active hydrogen of the surface silanol group.

For example, reaction with organic acid halides may esterify the silanol termination with an ester moiety. In this particular instance if the ester is a short hydrocarbon radical such as methyl, the only consequence is to remove the hydroxyl group from the multiplicity of possible silanol sites that could participate in a silanol condensation. On the other hand, if the ester is a that of a long chain fatty acid such as stearyl, the blocking action of the esterification is augmented by solubility considerations since the stearyl group is sufficiently long to interact with the polymer matrix in which the treated silica particle is being dispersed. This has additional consequences for the mechanical properties of the rubber. When this is done, the mechanical properties most significantly affected by this simultaneous blocking and increased dispersion are Shore A durometer, tensile strength, elongation, modulus, viscosity, compression set, compression stress relaxation, tear strength, heat age properties and the like.

Other reactions that may be employed are the reactions of tri-hydrocarbyl silanols ($R_3SiOH$, where R is selected from the group consisting of one to thirty carbon atom hydrocarbon radicals, di-hydrocarbyloxy- di-hydrocarbyl silanes (($R'O)_2R'_2Si$, where R' is selected from the group consisting of one to thirty carbon atom hydrocarbon radicals, and R" is selected from the group consisting of one to thirty carbon atom hydrocarbon radicals), low molecular weight cyclic silicones (($R_2SiO)_n$, where n ranges from 3 to about 6 and R is as defined above), and silazane compounds having the formula $(R_3Si)_2NH$, where R is defined as above. Examples of one to thirty carbon atom hydrocarbon radicals include but are not limited to methyl, ethyl, propyl, iso-propyl, butyl, iso-butyl, sec-butyl, pentyl, hexyl, heptyl, octyl, vinyl, allyl, 1-propenyl, phenyl, tolyl, xylyl, naphthyL anthracenyl and the like. When the thermoset formulation is a heat curable silicone rubber, these treatments seem to be the preferred methods of treating the silica fillers. For a given chemical reagent treating the silica to control the surface silanol density, the usual considerations of reactant concentration, reaction temperature, and reaction time interact to govern the extent of the reaction in reacting the surface silanol groups to produce the desired derivative chemical structures on the surface of the silica.

The range of control of physical properties of heat curable rubbers and thermosets achievable by controlling the surface silanol density of the silica filler will tend to vary somewhat depending on the chemical nature of the polymers constituting the heat curable rubber. Thus an alkenyl based heat curable rubber formulation will exhibit a different range of controlled physical properties as a function of controlling the surface silanol density of the silica filler relative to another thermoset, elastomeric or rubber formulation, e.g. methyl silicone gum based rubber formulations. Further, the ranges of these controlled physical properties may be shifted, may overlap, or may extend beyond. In other words, the range of control achievable by the process of the instant invention for one type of polymer matrix may be very much greater than for another.

Other filler materials, that also exhibit the phenomenon of hydroxyl termination's at the phase boundary constituting the termination of the structure should also be amenable to this process of control. Thus aluminas, silica-aluminas, titanias, borias, in fact any porous inorganic oxide having a reasonably high BET surface area, i.e. from 25 to 400 $m^2/g$, should be useful in the process of the present invention. While the present invention is a process, the process of the present invention leads to compositions having particularly desirable and controllable physical properties. This is the primary advantage and utility of the process of the present invention.

The process of the present invention provides for a class of heat curable silicone rubbers comprising silica fillers having a controlled surface silanol density whereby the resulting physical properties of Shore A durometer, tensile strength, elongation, modulus, viscosity, compression set, compression stress relaxation, tear strength, heat age properties, percent sealing force retention and the like are controlled within specific ranges when the surface silanol density is controlled within a specific range.

In addition to controlling the surface silanol density by chemical reaction, the reagent of choice may be further governed by a desire to functionalize the silanol blocking groups chemically attached to the surface of the silica through the reacted silanol group. For example, reaction of tetramethyldivinyldisilazane not only blocks the silanol by chemical reaction as previously set forth it also functionalizes the substituents so attached with a vinyl group. This radically changes the spectrum of possible polymer filler interactions because the functionalized filler now becomes capable of reacting with the polymer matrix in which it is dispersed. This has an additional effect on the physical properties of the heat curable rubber. Such functionalizing silanol blocking reagents may be preferably selected from the group consisting of tetravinyldimethyldisilazane, divinyltetramethylsilazane, vinyl-dimethyl-silanol, vinyl-dimethoxy-ethoxy-silane and vinyl-triethoxysilane. In general the functionalizing blocking agents have the formula:

$(R_{3-a}R'_a Si)_b Z$, where R is a one to thirty carbon atom hydrocarbon radical, R' is a one to thirty carbon atom alkenyl hydrocarbon radical, "a" is an integer varying from 1 to 3, and "b" is 1 or 2 when Z is selected from the group consisting of NH, OH, NR'H, NRH, OR, OR', O, SR, SR', $ONR_2$, $ONR'_2$, $ONRR'$, $OO_2CR'$, and $O_2CR$.

A particularly useful specific embodiment of the present invention comprises:

(a) from about 5 parts by weight to about 100 parts by weight of a vinyl on chain vinyl stopped gum having the formula:

$M^{vi}D^{vi}{}_x D_y M^{vi}$ where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$M^{vi}D_z M^{vi}$ where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$MD^{vi}{}_q M$ where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$MD_w M$ where w is an integer greater than zero whereby the viscosity of (d) is between 200,000 and 200,000,000 cps; whereby the quantities present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5; whereby the quantities present of the components (a), (b), (c), (d), and (e) add to between about 100.1 parts by weight to about 105 parts by weight;

(f) from about 15 to about 80 parts by weight of a fumed silica filler functioning as a reinforcing filler, having a BET surface area in the range of 90–400 m²/gm where the residual level of surface hydroxyl groups determined by nitrogenous base chemisorption and magic angle spinning solid state nmr is below a threshold value of 3.1 hydroxyl groups/nm2; whereby the quantities present of the components (a), (b), (c), (d), (e) and (f) add to between 115.1 parts by weight and 185 parts by weight;

(g) from about 0.01 to about 1.5 parts by weight of a vinyl specific curing agent, which is usually a peroxide;

whereby the quantities present of the components (a), (b), (c), (d), (e), (f) and (g) add to between 115.11 parts by weight and 186.5 parts by weight; where:

$M = R^1{}_3 SiO_{1/2}$ with $R^1$ selected from the group consisting of 1 to 8 carbon atom alkyl groups, phenyl, and trifluoropropyl;

$M^{vi} = R^2(R^1)_2 SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi} = R^2(R^1) SiO_{2/2}$ where $R^1$ and $R^2$ are as previously defined;

$D = (R^3)_2 SiO_{2/2}$ where each $R^3$ is independently selected from the group consisting of 1 to 8 carbon atom alkyl groups, phenyl, and trifluoropropyl; and $Q = SiO_{4/2}$.

The curable rubbers of the present invention may be made by a cold mixing process comprising the steps of:

(a) mixing a curable component selected from the group of alkenyl silicone gums having the formula:

$(M_a M^{vi}{}_{1-a})(D^{vi})_x (D)_y (M_a M^{vi}{}_{1-a})$ with a vinyl specific peroxide curing agent; and (b) controlling the temperature of the mixing whereby the temperature of the mixture does not exceed 100° C., preferably 90° C., more preferably 80° C. and most preferably 65° C. during the process of mixing.

While the silicone heat curable rubbers specifically embodied in the foregoing discussion generally cure by the addition of a peroxide curing agent, they may also be cured by condensation cure catalysts or by addition cure catalysts such as the noble metal hydrosilylation catalysts. When a platinum or other noble hydrosilylation catalyst is used the formulation of the curable rubber will be adjusted to include hydrogensiloxane or hydride fluids to assist in cure and crosslinking.

Further, the heat cured rubbers and articles of manufacture made from the composition of the present invention exhibit improved compression set and have markedly improved heat age properties. The heat cured rubbers made with the composition of the present invention are useful for gaskets, bushings, o-rings, tubing, medical tubing, gas masks, catheters, windshield wiper blades, spatula blades, automobile radiator hoses, spark plug boots, keyboard keypads, baby bottle nipples, electrical connectors, grommets, seals, diving masks, snorkels, earplugs, mouthguards, and foamed heat cured rubber products.

One very specific embodiment of the present invention relates to a heat curable silicone rubber composition that is cold processable consisting essentially of a mixture of the following components:

(a) a vinyl on chain vinyl stopped gum having the formula:

$$M^{vi}D^{vi}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) a vinyl on chain gum having non-reactive end groups with the following formula:

$$MD^{vi}_qM$$

where q is an integer greater than zero whereby the viscosity of (c) is between 200,000 and 200,000,000 cps and the alkenyl level varies from about 0.10 weight per cent to about 14.00 weight percent;

(d) an optional diluent gum having the following formula:

$$MD_wM$$

where w is an integer greater than zero whereby the viscosity of (d) is between 200,000 and 200,000,000 cps;

(e) an MQ resin, as a mold release agent, having a viscosity between 500 and 50,000 centipoise, where the ratio M:Q varies between about 0.8:1.0 and about 0.8:1.8;

(f) a fumed silica filler functioning as a reinforcing filler, having a BET surface area in the range of 90–400 m²/gm where the residual level of surface hydroxyl groups determined by nitrogenous base chemisorption or magic angle spinning solid state nmr is below a threshold value of 3.1 hydroxyl groups/nm²; and (g) any of several vinyl specific peroxide curing agents. The formulation may also contain extending fillers and other additives designed to impart specific performance properties.

In the components of the present invention, applicants define the following structures:

$M=R^1_3SiO_{1/2}$ where $R^1$ is selected from the group consisting of 1 to 8 carbon atom alkyl groups, phenyl, and trifluoropropyl;

$M^{vi}=R^2(R^1)_2SiO_{1/2}$ where $R^1$ is selected from the group consisting of 1 to 8 carbon atom alkyl groups, phenyl, and trifluoropropyl and $R^2$ is selected from the group of 2 to 10 carbon atom linear or cyclic alkenyl groups;

$D^{vi}_x=R^2(R^1)SiO_{2/2}$ where the R groups are as previously defined;

$D=(R^3)_2SiO_{2/2}$ where each $R^3$ group is independently selected from the group consisting of 1 to 8 carbon atom alkyl groups, phenyl, and trifluoropropyl; and $Q=SiO_{4/2}$. All of the gum components utilized by the present invention have a viscosity ranging from 200,000 to 200,000,000 centipoise at 25° C.

The amounts of the above components may be varied in a wide ranging fashion to produce rubbers of the present invention. Each of the components of the present invention are present in amounts as follows:

| Component | Lower Limit parts by weight | Upper Limit parts by weight |
|---|---|---|
| (a) | 5 | 100 |
| (b) | 0.2 | 95 |
| (c) | 0.2 | 75 |
| (d) | 0 | 30 |
| (e) | 0.1 | 5 |
| (f) | 15 | 80 |
| (g) | 0.01 | 1.5 |
| Extending fillers | 0 | 80 |
| Other Additives | 0 | 10 |

The first four components (a)+(b)+(c)+(d) must sum to 100 parts by weight and the total alkenyl level of the mixture of the four component gums (a), (b), (c), and (d) ranges between 0.21 weight percent and about 3.00 weight percent.

Applicants note that it is a standard chemical shorthand in the field of silicone chemistry to refer to various fluids, resins and gums by such general designations as MDM for an M-stopped polydiorganosiloxane where the degree of polymerization of the repeating D units is unspecified except as to viscosity of the resulting polymer. Thus more particularly, $MD_xM$, where x is a stoichiometric coefficient indicating a degree of polymerization would vary and low values of x produce pourable fluids, intermediate values of x produce more viscous fluids, and high values produce gums and that as x increases so does viscosity. Thus in terms of notation and equivalence, $MD^{vi}DM$ is exemplary of a chemical shorthand where the structure of the polymer more properly possesses stoichiometric subscripts, i.e. $MD^{vi}_xD_yM$, and these relate directly to degree of polymerization and viscosity. By stipulating a viscosity for a given polymeric silicone, these stoichiometric subscripts are defined, even if their presence must be inferred from the chemical shorthand used.

The vinyl specific peroxide curing agent (g) may be any one of several known in the art as taught in U.S. Pat. No. 4,539,357 at column 9 lines 1 et seq. Applicants specifically prefer peroxide curing agents such as 2,5-dimethyl-tert-butyl-peroxy-hexane; 2,4-dichloro-benzoylperoxide, di-cumyl-peroxide, and 1,1-di(tert-butylperoxytrimethyl)cyclohexane or mixtures thereof. Other curing agents may be employed if the formulation is modified slightly, e.g. hydrosilylation cures employing silyl hydrides or hydrogenpolysiloxanes and a noble metal catalyst, other addition cure catalysts or condensation cure catalyst.

One of the formulations of the present invention is unique insofar as the elimination of process aids is now possible.

Heretofore it has been necessary to add some small quantity of very low viscosity silanol or methoxy stopped fluids to prevent structuring of the filler when the mixture of gums and fumed silica filler is mixed together to form the precursor mixture to the composite and also to lower the viscosity of the very high viscosity gums used to make the precursor mixture since the lower viscosity aids in processing the mixture in milling equipment. U.S. Pat. No. 4,539,357 discusses the necessary use of process aids in the manufacture of heat cured rubbers from gums at column 10 line 53 et seq. The addition of such process aids has several serious drawbacks in the art of heat curable rubber compositions. At temperatures below about 150° C. the presence of a very low viscosity silicone fluid decreases heat stability and compression set of the final product rubber. At temperatures above about 150° C., the process aids tend to act as de-polymerization catalysts.

The elimination of process aids and the control of surface intensive properties of the silica filler leads to significant advantages. Mixtures of these particular gums are cold processable and the resulting heat curable rubbers apparently do not require the presence of additives that stabilize the cured rubber to the effects of petroleum derived oils.

The essential components of the heat curable rubbers of the present invention are the vinyl silicone gums which may be any of (a), (b), or (c); the mold release agent, the vinyl specific peroxide curing agent, and the reinforcing fumed or pyrogenic silica filler. To this mixture may be added extending fillers such as precipitated silica, finely divided quartz, mica, alumina, titania, and the like. Additionally, additive materials which impart specific performance features the finished cured rubber composition may also be incorporated such as zinc oxide, magnesium oxide, copper oxide, ferrous oxide, ferric oxide, aluminum oxide, titanium dioxide, ceric oxide, ceric hydroxide, and the various metal salts of long chain fatty acids such as the metal octoates.

The cold processable or mixable heat curable rubbers of the present invention have improved compression set, improved oil resistance, and improved compression stress relaxation, i.e. sealing force retention. By cold processable or mixable Applicants define a mixing process conducted below about 100° C.

The following examples are illustrative of the invention and serve as demonstrative examples only. By being set forth as examples of the invention, the following examples are not intended to limit the scope of the invention as conceived by the Applicants. All U.S. patent referenced herein are herewith specifically included by reference.

Experimental

Treated Silica 1:

To a 10 liter Drais mixer was charged 938 g of a raw fumed silica filler having a BET surface area of 200 m$^2$/g and a surface silanol density of 4.5 OH groups/nm (OH/nm). The filler was uniformly moisturized by the addition of 15 g of water followed by heating the water filler mixture to 130° C. while constantly agitating the mixture by maintaining a rotation speed of 258 rpm. The excess water vapor was vented leaving a residual moisture content on the filler of approximately 0.5 weight percent. 75 g of hexamethyldisilazane (HMDZ) was added to the hot filler and allowed to react under 10 psig pressure for a period of seven minutes. The unreacted hexamethyldisilazane, ammonia by-product and other volatile products were stripped from the filler by vacuum treating at a vacuum of 760 mm Hg for a period of 10 minutes. Subsequent surface analysis showed this filler to have a surface silanol density of 3.18 OH/nm.

Treated Silica 2:

176 g of a raw fumed silica filler having a BET surface area of 200 m2/g and a surface silanol density of 4.5 OH groups/nm (OH/nm) was charged to a 1 gallon high pressure autoclave reactor. The filler was uniformly moisturized in a procedure similar to that employed in the preparation of treated silica 1 except that the temperature was increased to 166° C. 14 g of hexamethydisilazane were used for the surface treatment with agitation conducted by rotating the mixing blades or impeller at 400 rpm. The reaction time period was 7 minutes and volatiles were stripped by vacuum as previously set forth. Subsequent surface analysis showed this filler to have a surface silanol density of 2.78 OH/nm.

Treated Silicas 3, 4, 5, 10, and 11:

These silicas were prepared by either the method used to prepare treated silica 1 or treated silica 2 treating the silica with various quantities of hexamethyldisilazane for various periods of time as shown in Table 1. Subsequent surface analysis showed the surface silanol densities to be as tabulated in Table 1.

TABLE 1

Surface Silanol Densities of Hexamethyldisilazane Treated Silica

| Treated Silica | Surface Silanol Density, OH/nm | HMDZ g HMDZ per 100 g SiO$_2$ | Reaction Time min. | Reaction Temp. °C. |
|---|---|---|---|---|
| 3 | 2.80 | 8 | 7 | 180 |
| 4 | 2.52 | 20 | 60 | 170 |
| 5 | 2.66 | 12 | 15 | 130 |
| 10 | 3.31 | 4 | 3 | 150 |
| 11 | 2.39 | 25 | 240 | 184 |

Treated Silica 8 and 9:

180 g of raw fumed silica filler having a BET surface area of 200 m$^2$/g and a surface silanol density of 4.5 OH groups/nm (OH/nm) was charged to a 1 gallon high pressure autoclave reactor. The filler was heated to 190° C. and 25 g of triethylsilanol (TESOH) was added under 6 psig of nitrogen. The reaction was allowed to continue for a period of 1 hour when the excess triethylsilanol, by-product hexaethylsiloxane, water and other volatiles were removed by vacuum stripping for a period of 20 minutes under a vacuum of 760 mm Hg at 185° C. Treated silica 8, prepared by this procedure had a surface silanol density of 3.20 OH/nm.

Varying this prep by decreasing the amount of TESOH to 18 g and decreasing the reaction time to 45 minutes produced treated silica 9 which had a surface silanol density of 3.85 OH/nm.

Treated Silica 12:

155 g of raw fumed silica filler having a BET surface area of 200 m$^2$/g and a surface silanol density of 4.5 OH groups/nm (OH/nm) was charged to a 1 gallon high pressure autoclave reactor. The filler was heated to 77° C. and 12.5 g of dimethoxydimethylsilane (DMDS) was added along with 1.4 g of hexamethyldisilazane. The reaction was conducted in two stages, a first stage lasting for one hour at 120° C., and a second stage lasting for two hours at 157° C. At the conclusion of the three hour reaction period, volatiles were stripped by applying a vacuum of 760 mm Hg for a period of twenty minutes at 157° C. Subsequent surface analysis showed a surface silanol density of 3.36 OH/nm Treated Silica Filler 6 and 7:

A raw fumed silica filler having a BET surface area of 200 m$^2$/g and a surface silanol density of 4.5 OH groups/nm (OH/nm) treated with octamethylcyclotetrasiloxane (D4), as taught in U.S. Pat. No. 2,983,009, produced a silica filler (6) having a surface silanol density of 3.12 OH/nm Treatment of a raw fumed silica filler having a BET surface area of 200 m²/g and a surface silanol density of 4.5 OH groups/nm (OH/nm) with both octamethylcyclotetrasiloxane and hexamethyldisilazane, as taught in U.S. Pat. No. 3,635,743, produced a silica filler (7) having a surface silanol density of 2.60 OH/nm.

Systematic Comparison of Heat Curable Rubber Compositions:

Each treated silica filler prepare above was compounded into a standard heat curable rubber formulation to evaluate the resulting physical properties produced as a result of the variation in surface silanol density. Thus test rubbers were made by compounding 100 parts by weight of a vinyl stopped polydimethylsiloxane gum having a vinyl content of 2,250 ppm and a viscosity of 225,000 poise with 20 parts by weight of the treated silica and 0.4 parts by weight of Lupersol 101®, a commercially available peroxide cure catalyst The test rubbers were mixed in a dough mixer and press cured for 17 minutes at 175° C. The press cured rubbers were then evaluated by various procedures including standard ASTM methods where appropriate.

Compression Stress Relaxation (CSR) Test Method:

An "O" ring test piece having an inner diameter of 12.7 mm and an outer diameter of 19.0 mm is cut from an ASTM slab of a press cured composition. The thickness of the "O" ring is measured at four places on the ring, with each measurement offset by a radial angle 90° relative to the previous measurement. The "O" ring is placed between parallel plates of a Shawbury-Wallace test device or jig that has been freshly cleaned and lightly oiled with IRM-903 oil as test fluid. The sample is then compressed 25% based on the initial average of the 4 four thickness measurements and after about 30 minutes of compression at ambient temperature, an initial counter force was determined by measuring the counter force on a Shawbury-Wallace compression stress relaxometer and subtracting the jig break force. The jig is then immersed in IRM-903 oil at 150°±2° C. to a depth covering the top parallel plate of the jig. The model rubbers, formulated with the treated silicas 1–14, were not immersed in oil, but rather simply aged in air at 150° C. At 168 hour intervals the jig is removed from the oil bath and the counter force measured after 4 hours at ambient temperature. The percent sealing force retention is then calculated by dividing the interval counter force by the initial counter force and multiplying by 100. Applicants note that compression stress relaxation and percent sealing force retention are used interchangeably in this specification.

TABLE 2

Systematic Comparison of the Physical Properties of a Standard Heat Cured Rubber Formulation as a Function of Silica Surface Silanol Density

| Treated Silica | Surface Silanol Density, OH/nm² | % Sealing Force Retention | Treatment |
|---|---|---|---|
| 1 | 3.18 | 13 | HMDZ |
| 2 | 2.78 | 29 | HMDZ |
| 3 | 2.80 | 18 | HMDZ |
| 4 | 2.52 | 18 | HMDZ |
| 5 | 2.66 | 21 | HMDZ |
| 6 | 3.12 | 16 | D4 |
| 7 | 2.60 | 36 | D4 + HMDZ |
| 8 | 3.20 | 15 | TESO |
| 9 | 3.85 | 0 | TESO |
| 10 | 3.31 | 13 | HMDZ |
| 11 | 2.39 | 28 | HMDZ |
| 12 | 3.36 | 0 | DMDS |

These results demonstrate that percent sealing force retention may be controlled within the ranges specified in Table 3.

TABLE 3

Ranges of Surface Silanol Density in Treated Silicas for Control of Percent Sealing Force Retention in a Vinyl Gum Based Heat Cured Rubber

| Surface Silanol Density Range | Percent Sealing Force Retention Range |
|---|---|
| about 3.30 and greater | about 0 to about 9.9 |
| about 2.90 to about 3.29 | about 10.0 to about 19.9 |
| about 2.40 to about 2.89 | about 20.0 to about 29.9 |
| below about 2.39 | above about 30.0 |

Treated Silica 13:

To a 1-liter 4-necked jacketed vessel was charged 86 g of silica filler which had been previously treated with octamethycyclotetrasiloxane (D4) having a surface silanol density of 3.12 OH/nm². The jacketed vessel was heated to 170° C. and a 760 mm Hg vacuum was applied. 8.6 g of tetramethyldivinyldisilazane was added. The reaction was allowed to continue for one hour at which time volatile by-products and unreacted reagents were removed by vacuum stripping. Surface analysis revealed the surface silanol density to be 2.77 OH/nm². Analysis of proton nuclear magnetic resonance and silicon-29 cross polarization magic angle spinning nuclear magnetic resonance resulted in a calculated vinyl level for the treated filler of 2,800 ppm.

Treated Silica 14:

The procedure utilized to prepare treated silica 13 was employed using a raw fumed silica filler having a BET surface area of 200 m²/g and a surface silanol density of 4.5 OH groups/ nm (OH/ nm). Subsequent analysis determined the surface silanol density to be 2.89 OH/nm and the vinyl content to be 3,000 ppm. Treated silicas 13 and 14 were compounded into the standard test rubber formulation as previously described, however the parts per hundred of filler were varied between 20, 30 or 40 parts per hundred parts base gum. In all instances 0.4 parts by weight of Lupersol 101® were used as the curing catalyst.

TABLE 4

Functionalized Treated Silica Fillers: Effect of Functionalization and Filler Loading on Physical Properties of a Standard Vinyl Gum Heat Curable Rubber

| Treated Silica | Surface Silanol Density, OH/nm | Vinyl Level, ppm | Filler Level pph | Shore A | % SFR |
|---|---|---|---|---|---|
| 6 | 3.12 | 0 | 20 | 27 | 23 |
| 6 | 3.12 | 0 | 30 | 35 | 0 |
| 14 | 2.89 | 3,000 | 20 | 40 | 38 |
| 14 | 2.89 | 3,000 | 40 | 67 | 13 |
| 13 | 2.77 | 2,850 | 20 | 37 | 51 |
| 13 | 2.77 | 2,850 | 40 | 61 | 60 |
| 7 | 2.60 | 0 | 20 | 23 | 36 |
| 7 | 2.60 | 0 | 30 | 26 | 22.5 |
| 7 | 2.60 | 0 | 40 | 32 | 18 |

Table 4 demonstrates that for non-functionalized treated silicas, as the filler loading is increased in the heat curable rubber, certain physical properties such as Shore A increase and certain other physical properties such as percent sealing force retention (% SFR) decrease. This generalization is valid for any level of surface silanol density. When the silanol blocking treatment that lowers surface silanol density includes a simultaneous functionalization of the substituents attached to the blocked surface silanol group, it is possible to retain a larger fraction of the percent sealing force while improving other physical properties such as Shore A. Thus functionalization coupled with control of the surface silanol density complements simple control of the surface silanol density of the silica filler. Thus filler loading may be increased by a factor of two retaining 50% of the percent sealing force retention at the lower filler loading, in contrast to no retention of percent sealing force when the filler is untreated with a functionalizing surface treating agent.

When utilized in a more complex heat curable rubber formulation such as an alkenyl formulation, the improvements achievable in physical properties while being realized are also associated with improvements in manufacture such as the ability to mix the precursors for the heat curable rubbers under conditions of relatively low temperature, rendering the mixtures cold processable.

EXAMPLE 1

An organopolysiloxane composition containing 0.2 mole % alkenyl as vinyl was prepared by blending in a non-heated mixer such as a Banbury mixer, a mixture composed of 67 parts by weight of a vinyl stopped polydimethysiloxane gum having a vinyl content of 225 wppm vinyl and a viscosity of 225,000 poise, 33 parts by weight of methyl stopped dimethysiloxane, vinylmethylsiloxane copolymer gum having a vinyl content of 0.2 weight percent and a viscosity of 400,000 poise, 0.5 parts by weight of an MQ siloxane resin, 40 parts by weight of a fumed silica having a surface hydroxyl concentration below 3.1 hydroxyls or silanols per square nanometer (nm) the surface hydroxyl concentration was reduced to below this level by treatment with octamethylcyclotetrasiloxane followed by treatment with hexamethyldisilazane having a surface area of 200 m$^2$/g; 20 parts by weight of 5 μm Minusil ®, 1.0 parts by weight zinc oxide, 0.25 parts by weight magnesium oxide, 0.45 parts by weight cerium hydroxide, and 0.12 parts by weight black iron oxide (ferrous oxide). This composition was thoroughly mixed while keeping the temperature below about 65° C. Following the addition of the foregoing components, 0.65 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 5.

EXAMPLE 2

An organopolysiloxane composition containing 0.2 mole % alkenyl as vinyl was prepared and cured as described in Example 1 except that the gum was a vinyl stopped dimethylsiloxane vinylmethylsiloxane copolymer gum having 800 wppm vinyl and a viscosity of 225,000 poise. The physical properties of this composition are listed in Table 5.

EXAMPLE 3.

An organopolysiloxane composition containing 0.4 mole % alkenyl as vinyl was prepared by blending in a non-heated mixer, i.e. a Banbury mixer, a mixture composed of 90 parts by weight of a vinyl stopped polydimethylsiloxane gum having a vinyl content of 225 wppm vinyl, and a viscosity of 225,000 poise, 10 parts by weight of a vinyl stopped dimethylsiloxane vinylmethylsiloxane copolymer gum having 4.o weight per cent vinyl and a viscosity of 580,000 poise, 0.5 parts by weight of an MQ siloxane resin, 35 parts by weight of a fumed silica as in Example 1; 15 parts by weight of 5 μm Minusil ®, 1.0 part by weight of zinc oxide, 0.25 parts by weight of magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.61 parts by weight of 2,5-dimethyl-di-(tertiary-butyl-peroxy)hexane was added as a free radical cure catalyst and after two minutes of mixing the batch was discharged, extruded through a 150 mesh screen, press cured at 177° C. for 17 minutes and tested for physical properties. The physical properties are summarized in Table 5.

EXAMPLE 4

An organopolysiloxane composition containing 0.4 mole % alkenyl as vinyl was prepared by blending in a non-heated mixer, i.e. a Banbury mixer, a mixture composed of 80 parts by weight of a vinyl stopped polydimethylsiloxane gum having a vinyl content of 225 wppm vinyl, and a viscosity of 225,000 poise, 10 parts by weight of vinyl stopped dimethylsiloxane vinylmethylsiloxane copolymer gum having a vinyl content of 4.0 weight per cent and viscosity of 580,000 poise, 10 parts by weight of a methyl stopped polydimethylsiloxane gum having a viscosity of 225,000 poise, 0.5 parts by weight of an MQ resin, 40 parts by weight of a fumed silica as in Example 1, 20 parts by weight of 5 μm Minusil ®, 1.0 parts by weight zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.65 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 5.

EXAMPLE 5

An organopolysiloxane composition containing 0.6 mole % alkenyl as vinyl was prepared by blending in a non-heated mixer, i.e. a Banbury mixer, a mixture composed of 80 parts by weight of a vinyl; stopped polydimethylsiloxane gum having 225 wppm vinyl and a viscosity of 225,000 poise, 20 parts by weight of a vinyl stopped dimethylsiloxane vinylmethylsiloxane copolymer gum having 4.0 weight per cent vinyl and a viscosity of 580,000 poise, 0.5 parts by weight of an MQ siloxane resin, 30 parts by weight of a fumed silica as in Example 1, 10 parts by weight of 5 μm Minusil ®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.57 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 5.

EXAMPLE 6

An organopolysiloxane composition containing 0.8 mole % alkenyl as vinyl was prepared by blending in a non-heated mixer, i.e. a Banbury mixer, a mixture composed of 75 parts by weight of a vinyl stopped dimethylsiloxane vinylmethylsiloxane copolymer gum having 800 wppm vinyl and a viscosity of 225,000, 15 parts by weight of a vinyl stopped dimethylsiloxane vinylmethylsiloxane copolymer gum having a vinyl content of 4.0 weight percent and a viscosity of 580,000 poise, 15 parts by weight a methyl stopped polydimethylsiloxane gum having a viscosity of 225,000 poise, 35 parts by weight of a fumed silica as in Example 1, 15 parts by weight of 5 μm Minusil ®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65 ° C. Following the addition of the foregoing components, 0.61 parts by weight of 2,5-dimethyl-di-(tertiary-butyl-peroxy)hexane was added as a free radical cure catalyst and after two minutes of mixing the batch was discharged, extruded through a 150 mesh screen, press cured at 177° C. for 17 minutes and tested for physical properties. The physical properties are summarized in Table 5.

EXAMPLE 7

An organopolysiloxane composition containing 0.6 mole % alkenyl as vinyl was prepared by blending in a non-heated mixer, i.e. a Banbury mixer, a mixture composed of 80 parts by weight of a vinyl stopped polydimethylsiloxane gum having a vinyl content o f 225 wppm vinyl and a viscosity of 225,000 poise, 20 parts by weight of a vinyl stopped dimethylsiloxane vinylmethylsiloxane copolymer gum having a vinyl content of 4.0 weight per cent and a viscosity of 580,000 poise, 0.5 parts by weight of an MQ siloxane resin, 35 parts by weight of a fumed silica as in Example 1, 19 parts by weight of 5 μm Minusil ®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.57 parts by weight of 2,5-dimethyl-di-(tertiary-butyl-peroxy)hexane was added as a free radical cure catalyst and after two minutes of mixing the batch was discharged, extruded through a 150 mesh screen, press cured at 177° C. for 17 minutes and tested for physical properties. The physical properties are summarized in Table 5.

EXAMPLE 8

An organopolysiloxane composition containing 0.5 mole % alkenyl as vinyl was prepared by blending in a non-heated mixer, i.e. a Banbury mixer, a mixture composed of 75 parts by weight of a vinyl stopped polydimethylsiloxane gum having a vinyl content of 225 wppm and a viscosity of 225,000 poise, 15 parts by weight of a vinyl stopped dimethylsiloxane vinylmethylsiloxane copolymer gum having a vinyl content of 4.0 weight percent and a viscosity of 580,000 poise, 10 parts by weight of a methyl stopped polydimethylsiloxane gum having a viscosity of 225,000 poise, 0.5 parts by of an MQ siloxane resin, 45 parts by weight of a fumed silica as in Example 1, 25 parts by weight of 5 μm Minusil ®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.65 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 5.

EXAMPLE 9

An organopolysiloxane composition containing 0.6 mole % alkenyl as vinyl was prepared by blending in a non-heated mixer, i.e. a Banbury mixer, a mixture composed of 70 parts by weight of a vinyl stopped polydimethylsiloxane gum having a vinyl content of 225 wppm and a viscosity of 5,000 poise, 20 parts by weight of a vinyl stopped vinyl stopped dimethylsiloxane vinylmethylsiloxane copolymer gum having a vinyl content of 4.0 weight per cent and a viscosity of 580,000 poise, 10 parts by weight of a methyl stopped polydimethylsiloxane gum having a viscosity of 25,000 poise, 0.5 parts by weight of an MQ siloxane resin, 39 parts by weight of a fumed silica as in Example 1, 15 parts by weight of 5 μm Minusil ®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.65 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 5.

TABLE 5

| | Physical Properties of Alkenyl Gum Heat Curable Rubbers | | | | | | | | |
|---|---|---|---|---|---|---|---|---|---|
| | Example | | | | | | | | |
| Property | 1 | 2 | 3 | 4 | 5 | 6 | 7 | 8 | 9 |
| Shore A | 45 | 46 | 47 | 50 | 50 | 53 | 59 | 59 | 59 |
| Tensile (psi) | 1059 | 980 | 1033 | 1112 | 993 | 800 | 1002 | 1084 | 1084 |
| Elongation % | 560 | 524 | 584 | 642 | 318 | 298 | 274 | 444 | 330 |
| 100% Modulus (psi) | 135 | 121 | 178 | 198 | 315 | 251 | 439 | 405 | 425 |
| Compression Set 22 Hours at 177° C. | 9.7 | 8.4 | 10.0 | 12.2 | 6.3 | 7.8 | 12.3 | 13.6 | 10.7 |
| CSR, % Sealing Force Retention | | | | | | | | | |
| 168 hrs | 43 | 41 | 38 | 41 | 55 | 47 | 49 | 44 | 41 |

TABLE 5-continued

Physical Properties of Alkenyl Gum Heat Curable Rubbers

| Property | Example | | | | | | | | |
|---|---|---|---|---|---|---|---|---|---|
| | 1 | 2 | 3 | 4 | 5 | 6 | 7 | 8 | 9 |
| 1000 hrs | 23 | * | * | 25 | 33 | 34 | 30 | 27 | 27 |
| 2000 hrs | ** | — | — | ** | 19 | 26 | 18 | 17 | 18 |

Notes:
*One week data only
**Data at 1000 hours

EXAMPLE 11

In order to show the effect of different fillers on compression set, an organopolysiloxane composition containing 0.6 mole % alkenyl as vinyl was prepared by blending in a non-heated mixer, i.e. a Banbury mixer, a mixture composed of 80 parts by weight of a vinyl stopped polydimethylsiloxane gum having a vinyl content of 225 wppm vinyl and a viscosity of 225,000 poise, 20 parts by weight of a vinyl stopped dimethylsiloxane vinylmethylsiloxane copolymer gum having a weight percent vinyl content of 4.0 weight percent vinyl and viscosity of 580,000 poise, 0.5 parts by weight of an MQ siloxane resin, 30 parts by weight of an octamethylcyclotetrasiloxane treated fumed silica having a surface area of 200 m$^2$/g and a surface hydroxyl content in excess of $2.75 \times 10^9$ hydroxyls/ m$^2$, 10 parts by weight of 5 μm Minusil ®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.60 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 6.

EXAMPLE 12

In order to demonstrate the effect of silanol process aids on compression, an organopolysiloxane composition containing 0.6 mole % alkenyl as vinyl was prepared by blending in a non-heated mixer, i.e. a Banbury, 80 parts by weight of a vinyl stopped polydimethylsiloxane gum having a vinyl content of 225 wppm vinyl and a viscosity of 225,000 poise, 20 parts by weight of a vinyl stopped dimethylsiloxane vinylmethylsiloxane copolymer gum having a vinyl content of 4.0 weight per cent vinyl and a viscosity of 580,000 poise, 0.5 parts by weight of an MQ siloxane resin, and 30 parts by weight of a fumed silica as in Example 1, 2.0 parts by weight of a silanol stopped fluid having 6.0 weight per cent silanol and a viscosity of 35 centistokes, 10 parts by weight of 5 μm Minusil ®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.60 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 6.

TABLE 6

Physical Properties of Alkenyl Gum Heat Curable Rubbers

| Property | Example | |
|---|---|---|
| | 11 | 12 |
| Shore A | 56 | 50 |
| Tensile (psi) | 1042 | 1003 |
| Elongation % | 267 | 316 |
| 100% Modulus (psi) | 449 | 293 |
| Compression Set at 22 hrs at 177° C., % | 39.7 | 18.4 |

EXAMPLE 13

An organopolysiloxane composition containing 0.6 mole % vinyl was prepared by blending in a non-heated mixer, such as a Banbury mixer, a mixture composed of 70 parts by weight of a vinyl stopped polydimethylsiloxane gum having a vinyl content of 225 ppm vinyl and a viscosity of 225,000 poise, 20 parts by weight of a vinyl stopped dimethylsiloxane vinylmethylsiloxane copolymer gum having a vinyl content of 4.0 weight percent vinyl and a viscosity of 580,000 poise, 10 parts by weight of a methyl stopped polydimethylsiloxane gum having a viscosity of 225,000 poise, 0.5 parts by weight of a siloxane MQ resin where M is trimethylsilyl and the M to Q ratio ranges from between 0.8:1.0 to about 0.8:1.5, 39 parts by weight of fumed silica having a surface hydroxyl concentration below $2.75 \times 10^9$ hydroxyls or silanols wherein the surface hydroxyl concentration was reduced to below this level by treatment with octamethylcyclotetrasiloxane followed by treatment with hexamethyldisilazane having a surface area of 200 m$^2$/g; and 15 parts by weight of 5 μm Minusil ®, the entire formulation totaling 154.5 parts by weight. The formulation was thoroughly mixed keeping the temperature of the composition below about 65° C. To the mixing composition was added 0.65 parts by weight, now 155.15 parts by weight total, of 2,5-dimethyl-di-(tertiary-butylperoxy)hexane cure catalyst After two additional minutes of mixing the batch was discharged passed through a 150 mesh screen, press cured at 177° C. for 17 minutes and evaluated for physical properties. The physical properties of this composition are listed in Table 7.

TABLE 7

Physical Properties of Alkenyl Gum Heat Curable Rubbers

| | Example | | |
|---|---|---|---|
| Property | 11 | 12 | 13 |
| Shore A | 56 | 50 | 45 |
| Tensile (psi) | 1042 | 1003 | 1059 |
| Elongation % | 267 | 316 | 560 |
| 100% Modulus (psi) | 449 | 293 | 135 |
| Compression Set at 22 hrs at 177° C., % | 39.7 | 18.4 | 9.7 |
| % Sealing Force Retention | | | |
| at 168 hrs | valid numbers | | 43 |
| at 1000 hrs | not possible | | 27 |
| at 2000 hrs | with CS* >30 | | 15 |

Note:
*CS = compression set

While there are a number of physical comparisons typically utilized in the evaluation of heat cured rubbers, the measurement most directly associated with compression stress relaxation (sealing force retention) is compression set. The following comparisons indicate that it is generally not possible to correlate compression stress relaxation and compression set even when there are minor variations in the composition of the rubber. The following samples compounded from a high molecular weight gum, a reinforcing filler and an extending filler demonstrate this point (Table 7A).

TABLE 7A

Comparison of Sealing Force Retention and Compression Set

| Rubber | Composition Variation or Description | CS | % SFR |
|---|---|---|---|
| A | GE Silicones | 19 | 40 |
| B | Dow Corning | 16 | 34 |
| C | vinyl gum (1) 225 kcps | 15 | 40 |
| D | vinyl gum (2) 500 kcps + 17 pph mineral filler | 37 | 42 |
| E | vinyl gum (3) | 15 | 40 |
| F | vinyl gum (3) + 17 pph mineral filler | 17 | 29 |

CS = compression set at 22 hrs./350° F.;
% SFR = percent sealing force retention.

Compression set, as shown by the above comparisons, does not correlate with or predict percent sealing force retention. Further percent sealing force retention (compression stress relaxation) does not correlate with or predict compression set.

The following data indicate the relationship between length of time treated and weight percent treating agent added in terms of controlling the surface silanol density of the fumed silica filler, Table 8.

TABLE 8

Time and Quantity Relationships to Treat Fumed Silica Fillers with Hexamethyldisilazane (HMDZ)

| Treated Silica | OH/nm² | Wt. % HMDZ* | Time (min.) |
|---|---|---|---|
| 11 | 2.39 | 25.0 | 240 |
| 4 | 2.52 | 20.0 | 60 |
| 5 | 2.66 | 12.0 | 15 |
| 3 | 2.60 | 8.0 | 7 |
| 10 | 3.31 | 4.0 | 3 |

*Wt. % HMDZ = (grams of HMDZ to treat/weight of silica treated) × 100

These data indicate that in order to maintain the surface silanol density of a fumed silica filler at levels of 3.30 (OH/nm²) or greater treatment times must be below 3 minutes and the amount of hexamethyldisilazane added to the silica must be below about 4 g for every 100 g of fumed silica. For control of the surface silanol levels between 2.90 and 3.30 (OH/nm²) the treatment times should range from about 3 to about 7 minutes and the amount of hexamethyldisilazane added to the silica should range between about 4 and about 8 g for every 100 g of fumed silica. For control of the surface silanol levels between 2.9 and 2.4 (OH/nm²) the treatment times should range from about 7 to about 240 minutes and the amount of the hexamethyldisilazane added to the silica should range from about 8 to about 25 g for every 100 g of fumed silica. For control of the surface silanol levels below 2.4 (OH/nm²) the treatment times should be in excess of about 240 minutes and the amount of hexamethyldisilazane added to the silica should be in excess of about 25 g for every 100g of fumed silica.

TABLE 9

Residual Surface Silanol Density versus Compression Stress Relaxation in a Standard Rubber Formulation

| Treated Silica | Surface Silanol Density, OH/nm | % Sealing Force Retention | Treatment |
|---|---|---|---|
| 9 | 3.85 | 0 | TESO |
| 12 | 3.36 | 0 | DMDS |
| 10 | 3.31 | 13 | HMDZ |
| 8 | 3.20 | 15 | TESO |
| 1 | 3.18 | 13 | HMDZ |
| 6 | 3.12 | 16 | D4 |
| 3 | 2.80 | 18 | HMDZ |
| 2 | 2.78 | 29 | HMDZ |
| 5 | 2.66 | 21 | HMDZ |
| 7 | 2.60 | 36 | D4 + HMDZ |
| 4 | 2.52 | 18 | HMDZ |
| 11 | 2.39 | 28 | HMDZ |

These data have been linearly regressed to yield a relationship between the surface silanol density, irrespective of treatment, and compression stress relaxation. That regression is:

$$CSR\ (all) = -21.02(OH/nm^2) + 79.91.$$

When the data set is confined to the same chemical treatment, a linear regression on the smaller data set yields the relationship for HMDZ:

$$CSR\ (HMDZ) = -13.82(OH/nm^2) + 58.77.$$

Based on these regressions, control of surface silanol density leads to the control of the resulting CSR depending somewhat on the regression function chosen (Table 10).

TABLE 10

Minimum Values of Surface Silanol Densities in Fumed Silica Fillers to Impart a CSR of a Given or Greater Value

| | Surface Silanol Densities (OH/nm²) | | |
|---|---|---|---|
| CSR | Function CSR (all) | CSR (HMDZ) | Control Range |
| 10 | 3.33 | 3.53 | 3.33 |
| 15 | 3.09 | 3.16 | 3.09 |
| 20 | 2.85 | 2.81 | 2.81 |
| 25 | 2.61 | 2.44 | 2.44 |
| 30 | 2.37 | 2.08 | 2.08 |
| 35 | 2.14 | 1.72 | 1.72 |

TABLE 10-continued

Minimum Values of Surface Silanol Densities in Fumed
Silica Fillers to Impart a CSR of a Given or Greater Value Surface Silanol Densities (OH/nm²)

| CSR | Function CSR (all) | CSR (HMDZ) | Control Range |
|---|---|---|---|
| 40 | 1.90 | 1.36 | 1.36 |
| 45 | 1.66 | 1.00 | 1.00 |
| 50 | 1.42 | 0.63 | 0.63 |

These values confirm the control ranges in Table 3.

Having described the invention, that which is claimed is:

1. A heat curable silicone rubber composition comprising:
(a) from about 5 parts by weight to about 100 parts by weight of a vinyl on chain vinyl stopped gum having the formula:

$$M^{vi}D^{vi}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$MD^{vi}_qM$$

where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$$MD_wM$$

where w is an integer greater than zero whereby the viscosity of (d) is between 200,000 and 200,000,000 cps;

whereby the quantifies present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5;

whereby the quantities present of the components (a), (b), (c), (d), and (e) add to between about 100.1 parts by weight to about 105 parts by weight;

(f) from about 15 to about 80 parts by weight of a fumed silica filler treated by the process of (i) contacting a fumed silica filler having a surface with a compound that will react with silanol groups present on said surface of said silica, said compound selected from the group consisting of vinyl-dimethyl-silanol, vinyl-dimethoxy-ethoxy-silane, vinyl-triethoxy-silane, hexamethyldisilazane, hexamethyldisiloxane, divinyltetramethyldisilazane, tetramethyldivinyldisilazane, octamethylcyclotetrasiloxane, decamethylcyclopentasiloxane, duodecamethylcyclohexasiloxane, triethysilanol and mixtures thereof, (ii) forming reacted silanol groups that are the product of contacting said silica with said compound thereby reducing the number of unreacted surface silanol groups below about 3.29 silanol groups per square nanometer of surface of said silica;

whereby the quantities present of the components (a), (b), (c), (d), (e) and (f) add to between 115.1 parts by weight and 185 parts by weight;

(g) from about 0.01 to about 1.5 parts by weight of a vinyl specific curing agent; whereby the quantities present of the components (a), (b), (c), (d), (e), (f) and (g) add to between 115.11 parts by weight and 186.5 parts by weight; where:

$M=R^1_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$;

whereby the sealing force retention of said heat curable silicone rubber composition when cured is above about 10.

2. A heat curable silicone rubber composition comprising:
(a) from about 5 parts by weight to about 100 parts by weight of a vinyl on chain vinyl stopped gum having the formula:

$$M^{vi}D^{vi}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$MD^{vi}_qM$$

where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$$MD_wM$$

where w is an integer greater than zero whereby the viscosity of (d) is between 200,000 and 200,000,000 cps;

whereby the quantities present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5; whereby the quantities present of the components (a), (b), (c), (d), and (e) add to between about 100.1 parts by weight to about 105 parts by weight;

(f) from about 15 to about 80 parts by weight of a fumed silica filler treated by the process of
 (i) contacting a fumed silica filler having a surface with a compound that will react with silanol groups present on said surface of said silica, said compound selected from the group consisting of vinyl-dimethyl-silanol, vinyl-dimethoxy-ethoxy-silane, vinyl-triethoxy-silane, hexamethyldisilazane, hexamethyldisiloxane, divinyltetramethyldisilazane, tetramethyldivinyldisilazane, octamethylcyclotetrasiloxane, decamethylcyclopentasiloxane, duodecamethylcyclohexasiloxane, triethysilanol and mixtures thereof,
 (ii) forming reacted silanol groups that are the product of contacting said silica with said compound thereby reducing the number of unreacted surface silanol groups below about 2.89 silanol groups per square nanometer of surface of said silica;
whereby the quantities present of the components (a), (b), (c), (d), (e) and (f) add to between 115.1 parts by weight and 185 parts by weight;

(g) from about 0.01 to about 1.5 parts by weight of a vinyl specific curing agent;
whereby the quantifies present of the components (a), (b), (c), (d), (e), (f) and (g) add to between 115.11 parts by weight and 186.5 parts by weight; where:

$M=R^1{}_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$;

whereby the sealing force retention of said heat curable silicone rubber composition when cured is above about 20.

3. A heat curable silicone rubber composition comprising:

(a) from about 5 parts by weight to about 100 parts by weight of a vinyl on chain vinyl stopped gum having the formula:

$$M^{vi}D^{vi}{}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$MD^{vi}{}_qM$$

where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$$MD_wM$$

where w is an integer greater than zero whereby the viscosity of (d) is between 200,000 and 200,000,000 cps;

whereby the quantities present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5; whereby the quantities present of the components (a), (b), (c), (d), and (e) add to between about 100.1 parts by weight to about 105 parts by weight;

(f) from about 15 to about 80 parts by weight of a fumed silica filler treated by the process of
 (i) contacting a fumed silica filler having a surface with a compound that will react with silanol groups present on said surface of said silica, said compound selected from the group consisting of vinyl-dimethyl-silanol, vinyl-dimethoxy-ethoxy-silane, vinyl-triethoxy-silane, hexamethyldisilazane, hexamethyldisiloxane, divinyltetramethyldisilazane, tetramethyldivinyldisilazane, octamethylcyclotetrasiloxane, decamethylcyclopentasiloxane, duodecamethylcyclohexasiloxane, triethysilanol and mixtures thereof,
 (ii) forming reacted silanol groups that are the product of contacting said silica with said compound thereby reducing the number of unreacted surface silanol groups below about 2.39 silanol groups per square nanometer of surface of said silica;

whereby the quantities present of the components (a), (b), (c), (d), (e) and (f) add to between 115.1 parts by weight and 185 parts by weight;

(g) from about 0.01 to about 1.5 parts by weight of a vinyl specific curing agent;

whereby the quantities present of the components (a), (b), (c), (d), (e), (f) and (g) add to between 115.11 parts by weight and 186.5 parts by weight; where:

$M=R^1_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$;

whereby the sealing force retention of said heat curable silicone rubber composition when cured is above about 30.

4. A heat curable silicone rubber composition comprising:
(a) from about 5 parts by weight to about 100 parts by weight of a vinyl on chain vinyl stopped gum having the formula:

$$M^{vi}D^{vi}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$MD^{vi}_qM$$

where q is an integer greater than zero whereby the viscosity of (c) is between 200,000 and 200,000,000 cps and the alkenyl level varies from about 0.10 weight per cent to about 4.00 weight percent;

(d) from about 0.0001 parts by weight to about 30 parts by weight of a diluent gum having the following formula:

$$MD_wM$$

where w is an integer greater than zero whereby the viscosity of (d) is between 200,000 and 200,000,000 cps;

whereby the quantities present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5;

whereby the quantities present of the components (a), (b), (c), (d), and (e) add to between about 100.1 parts by weight to about 105 parts by weight;

(f) from about 30 to about 160 parts by weight of a fumed silica filler treated by the process of
(i) contacting a fumed silica filler having a surface with a compound that will react with silanol groups present on said surface of said silica said compound selected from the group consisting of divinyltetramethyldisilazane, tetramethyldivinyldisilazane, vinyl-dimethyl-silanol, vinyl-dimethoxy-ethoxy-silane, vinyl-triethoxy-silane, and mixtures thereof,
(ii) forming reacted silanol groups that are the product of contacting said silica with said compound thereby reducing the number of unreacted surface silanol groups per unit surface of said silica producing thereby a treated reinforcing silica filler;

whereby the quantities present of the components (a), (b), (c), (d), (e) and (f) add to between 115.1 parts by weight and 185 parts by weight;

(g) from about 0.01 to about 1.5 parts by weight of a vinyl specific curing agent;

whereby the quantities present of the components (a), (b), (c), (d), (e), (f) and (g) add to between 145.11 parts by weight and 346.5 parts by weight; where:

$M=R^1_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$;

whereby the amount of treated reinforcing silica filler may be increased in said heat curable rubber composition by a factor of up to about two whereby percent sealing force retention decreases by no more than fifty percent in said heat curable rubber composition when said heat curable composition is cured when the amount of said treated reinforcing silica filler in said heat curable composition is so increased.

* * * * *